(12) United States Patent
Soljacic et al.

(10) Patent No.: US 7,031,585 B2
(45) Date of Patent: Apr. 18, 2006

(54) USING ELECTRO-MAGNETICALLY INDUCED TRANSPARENCY IN PHOTONIC CRYSTAL CAVITIES TO OBTAIN LARGE NON-LINEAR EFFECTS

(75) Inventors: Marin Soljacic, Somerville, MA (US); John D. Joannopoulos, Belmont, MA (US); Lene Vestergaard Hau, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/726,454

(22) Filed: Dec. 3, 2003

(65) Prior Publication Data

US 2004/0175087 A1  Sep. 9, 2004

Related U.S. Application Data

(60) Provisional application No. 60/430,957, filed on Dec. 4, 2002.

(51) Int. Cl.
*G02B 6/10* (2006.01)
(52) U.S. Cl. ........................ 385/129; 385/122
(58) Field of Classification Search ............... None
See application file for complete search history.

(56) References Cited

U.S. PATENT DOCUMENTS

2004/0175087 A1 * 9/2004 Soljacic et al. ............. 385/129

OTHER PUBLICATIONS

"Intracavity Electromagnetically Induced Transparency," Lukin et al. *Optics Letters*. Feb. 1998. vol. 23, No. 4.
"Observation of Coherent Optical Information Storage in an Atomic Medium Using Halted Light Pulses," Liu et al. *Nature*. Jan. 2001. vol. 409.
"Nonlinear Optics at Low Light Levels," Harris et al. *Physical Review Letters*. Jun. 1999. vol. 82, No. 23.
"Observation of Ultraslow and Stored Light Pulses in a Solid," Turukin et al. *Physical Review Letters*. Jan. 2002. vol. 88, No. 2.
"Efficient Electromagnetically Induced Transparency in a Rare-Earth Doped Crystal," Ham et al. *Optics Communications*. Dec. 1997. vol. 144.
"Nonlinear Optical Processes Using Electromagnetically Induced Transparency," Harris et al. *Physical Review Letters*. Mar. 1990. vol. 64, No. 10.
"Electromagnetically Induced Transparency," Harris. *Physics Today*. Jul. 1997.

(Continued)

*Primary Examiner*—Frank G. Font
*Assistant Examiner*—Michael P. Mooney
(74) *Attorney, Agent, or Firm*—Gauthier & Connors

(57) ABSTRACT

A photonic crystal structure includes a microcavity (point defect). The photonic crystal structure (or just the microcavity) is doped with materials that exhibit electro-magnetic induced transparency (EIT) so as to increase the non-linear properties of the photonic crystal.

8 Claims, 7 Drawing Sheets

OTHER PUBLICATIONS

"Photonic-Bandgap Microcavities in Optical Waveguides," Foresi et al. *Nature*. Mov. 1997. vol. 390.

"Cavity-QED Using Quantum Dots," Imamoglu. *Optics & Photonic News*. Aug. 2002.

"Self-Induced transparency and giant nonlinearity in doped photonic crystals," Kurizki et al. *J. Opt. Soc. Am. B*. Sep. 2002. vol. 19, No. 9.

"Enhancement of Phase Sensitivity by Exploring Slow Light in Photonic Crystals," Soljacic et al. *Proceedings of SPIE*. 2002. vol. 4870.

"Variable Semiconductor All-Optical Buffer," Ku et al. *Electronics Letters*. Nov. 2002. vol. 38, No. 24.

"Si-based Photonic Crystals and Photonic-Band-Gap Waveguides," Notomi et al. *Procedings of SPIE*. 2002. vol. 4655.

"Photonic Crystal Microcavities for Cavity Quantum Electrodynamics," Reese et al. *Proceedings of SPIE*. 2002. vol. 4655.

* cited by examiner

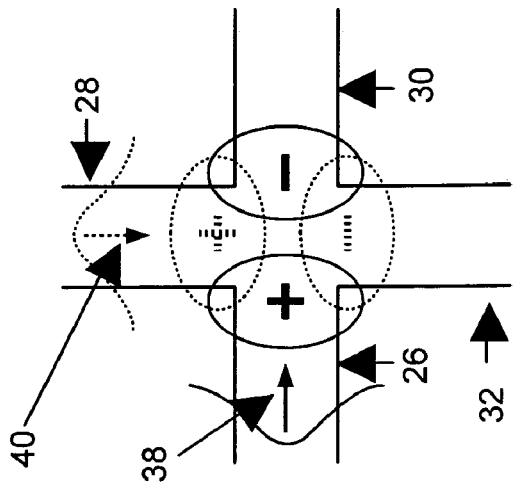
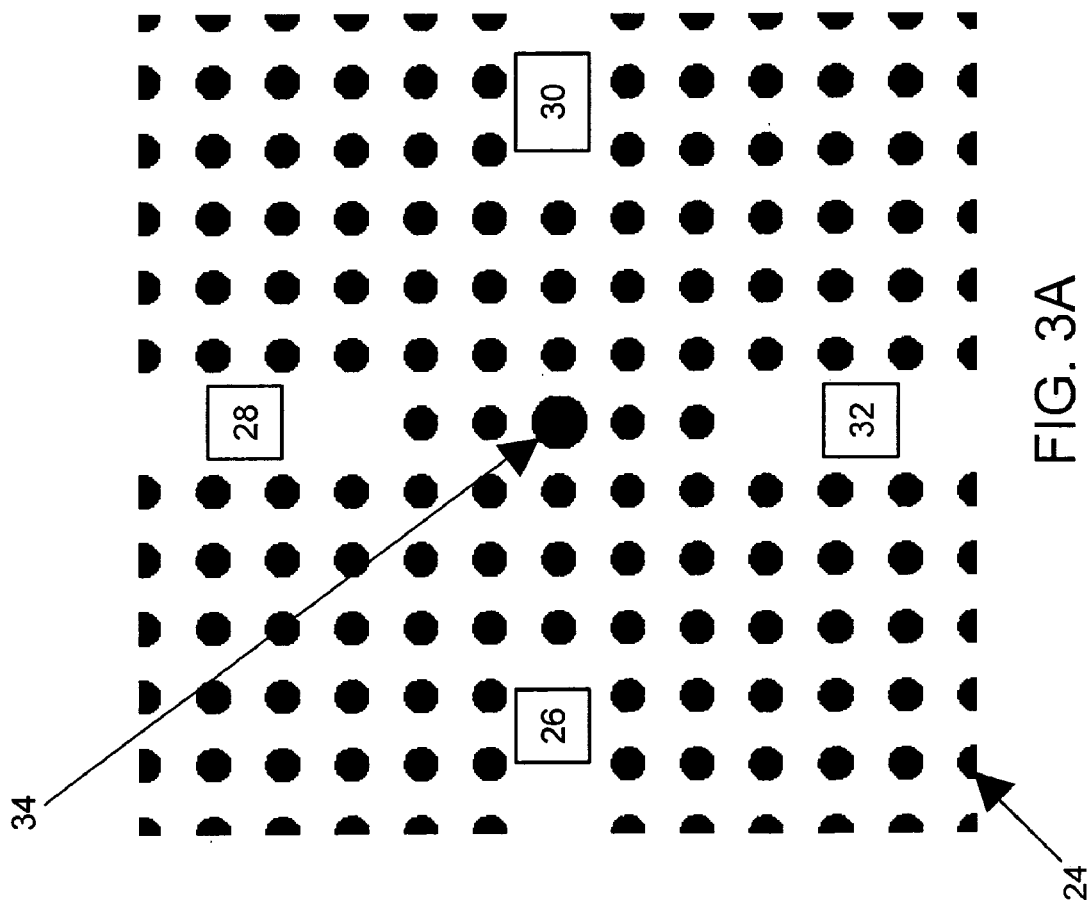

USING ELECTRO-MAGNETICALLY INDUCED TRANSPARENCY IN PHOTONIC CRYSTAL CAVITIES TO OBTAIN LARGE NON-LINEAR EFFECTS

PRIORITY INFORMATION

This application claims priority from provisional application Ser. No. 60/430,957 filed Dec. 4, 2002, which is incorporated herein by reference in its entirety.

BACKGROUND OF THE INVENTION

The invention relates to the field of solid-state based electro-magnetically induced transparency (EIT), and in particular to exploring solid-state-based electro-magnetically induced transparency (EIT) as a non-linear medium in photonic crystal cavities.

In the nodes of any long-haul telecommunication network, one needs to perform electro-optical conversion in order to process optical signals. The tasks that typically need to be performed include: routing, regeneration, changing wavelengths, changing bit-rates, etc. Since bit-rates in long-haul networks are typically high (10 Gbit/s today, and 40 Gbit/s in the next generation networks), one is forced to use ultra-fast (>100 GHz for 40 Gbit/s) electronics to perform such tasks. There are various physical reasons that prevent electronics from functioning well at so high frequencies, making such electronics extremely expensive. In fact, almost 90% of the cost of any long-haul network lies in modules that perform electro-optical conversion. Consequently, there is a rapidly growing need and interest in developing satisfactory all-optical signal processing. The requirements on all-optical signal processing are: to be ultra-fast (>100 GHz) and operate at telecommunication power levels (<5 mW peak power). Furthermore, it would be highly beneficial if the all-optical solution would be integrable (and therefore small); integrating many functions on the same chip would drastically reduce production and operating costs. Unfortunately, in experimental integrated all-optical devices that achieve the desired performance today, much higher power levels are needed.

Another important application where very large optical non-linearities could play a crucial role is the emerging field of quantum information, and quantum computation. Due to their minimal interactions with environment (so decoherence rates are low), and low absorption losses in many media, photons are the preferred long-distance carriers of quantum information. At various nodes of such a quantum-information network, the information will need to be processed. Although quantum information can be transferred from one system (e.g. photons) into another (e.g. electrons), and then back, such transfers are technologically challenging. Consequently, there is a need to perform all-optical quantum-information processing. To achieve this, one has to have non-linear effects large enough to be triggered by single-photon power levels. More generally, because of their low decoherence rates, photons might very well also turn out to be the preferred way of implementing quantum computation. In that case, the currently non-existing capability to influence the quantum state of a single photon with a single other photon will become even more important.

In early 1980s, the prospect of all-optical computers was a hot area of research. Such computers could conceivably operate at much higher clock speeds, and would be much more amenable to high-degree parallelization than electronic computers. Unfortunately, the power requirements needed to obtain large enough non-linearities to realize this scheme with the solutions that existed at the time were many orders of magnitude too large for all-optical computing to be feasible. For example, even using the most optimistic currently available technology and ultra-fast materials, an all-optical logical gate operating at 10 Gbit/s would require operational power >1 mW. If one imagines a 1 cm*1 cm surface all-optical microprocessor with $10^6$ such gates, which is a typical number of gates needed for very large-scale integration (VLSI), one needs to supply 1 kW to such a microprocessor, and at the same time be able to remove all the heat generated when operating with such large powers. Clearly, this scheme is not feasible. Nevertheless, it seems that if better non-linear materials were available so that the needed power is reduced by say 3 orders of magnitude, all-optical computing would become a very interesting prospect again.

One approach to achieve enhancement of non-linear effects is to find materials that have as strong non-linear responses as possible. One can obtain fairly large non-linear effects with only moderate power levels if one is willing to use materials with slow time responses. In such materials, the non-linear effect is basically cumulative in time, so many photons participate over time in establishing the given non-linear effect: the longer the accumulation time, the lower the power requirements. Unfortunately, this approach cannot be used if ultra-fast operation is desired. In fact, the only non-linearities at our disposal that have a response and recovery time faster than 1 ns are based either on electronic polarization, or on molecular orientation; for response times faster than 1 ps, the only viable option is exploring non-linear effects based on electronic-polarization.

In simplified terms, non-linear effects based on electronic-polarization come about because a strong external electrical field modifies the electronic orbit to the point where the polarization becomes non-linear in the applied field. Clearly, the scale that sets the onset of this non-linear behavior is given by the electrical field that binds the electron to the atom; consequently, large external field intensities are required to observe non-linear behavior. Consider, for example, the Kerr effect in which the non-linearly induced change to the index of refraction is given by $\delta n = n_2 * I$, where I is the intensity; for GaAs at $\lambda_{AIR} = 1.55$ µm, $n_2 = 1.5 * 10^{-13}$ $cm^2/W$, and to obtain $\delta n = 10^{-4}$, $I=1$ $GW/cm^2$ is needed. These requirements can be somewhat lowered if the electrons are only weakly bound, like for example in some polymers (which have large orbitals), or in quantum dots. Still, improvements of more than one order of magnitude are un-feasible, and such materials are typically difficult to work with and difficult to integrate with other optical materials on the same chip.

In principle, huge non-linear responses could be obtained, if the carrier frequency of the optical beam is close to an electronic transition resonance frequency; in that case, even a small applied intensity can significantly distort the electronic-orbit, and drive it into the non-linear regime. Unfortunately, this approach is necessarily accompanied with enormously large absorption of the optical beam. Furthermore, since this is a resonant phenomenon, the response and recovery times are necessarily large. Nevertheless, under certain conditions, one can apply another (coupling) frequency beam whose presence (through quantum interference) prevents the absorption of the original (probe) beam, like in FIG. 1A; this is the essence of the phenomenon of electro-magnetically induced transparency (EIT).

FIG. 1A is schematic diagram of an EIT system 2, which involves 3 states |1>, |2>, and |3>; the system is initially in state |1>. A probe beam 4, with frequency $\omega_p$ is resonant with the transition |1>→|3>; if this is the only beam present, it experiences large absorption. However, another (coupling) beam 6 can be applied, with frequency $\omega_c$, being resonant with the transition |2>→|3>, so the electro-magnetically induced transparency (EIT) makes the medium transparent to $\omega_p$. FIGS. 1B–1C show results of an EIT experiment. FIG. 1B shows transmission as a function of $\omega_p$ (when $\omega_c$ is present); FIG. 1C shows the refractive index as observed by $\omega_p$ as a function of $\omega_p$. EIT has been demonstrated to reduce absorptions of the probe beams by numerous orders of magnitude in many different systems.

Since in EIT the probe beam frequency is at the peak of an electronic resonance transition, the non-linear response is enormous. For example, measured Kerr coefficient as large as $n_2$=0.18 cm$^2$/W, are obtainable, which is 12 orders of magnitude larger than the Kerr coefficient of GaAs. With currently existing experimental setups, such a large Kerr coefficient is already close to enabling non-linear effects at single-photon levels. Furthermore, the response and recovery times for such large non-linearities can be made to be faster than 1 ps.

Another approach of maximizing non-linear effects has to do with optimizing the structure of the device (rather than the material). A simple way to make use of the tiny non-linear effects that result when modest intensity beams propagate in a typical material is to allow the effects to accumulate over long propagation distance. This approach has been successfully used for many applications, but typically imposes some serious constraints. For example, in order to accumulate non-linearly self-induced phase shift of π (which can then be explored for interferometric switching) with a 5 mW peak-power signal in a typical silica fiber ($\lambda_{AIR}$=1.55 μm, $n_2$=3*10$^{-16}$ cm$^2$/W, modal area ≈50 μm$^2$), one needs to propagate for more than 200 km, which is prohibitively too long given the linear losses of silica of 0.2 dB/km.

An additional approach that can be taken is to reduce the modal area. Since the non-linearities depend on the intensity, structures with smaller modal areas have smaller power requirements. Silica fibers exploit low index-contrast guiding, so their modal areas are fairly large. When a high index-contrast is used (like in integrated optics), the modal area can be readily reduced to <$(\lambda/3)^2$, which decreases the length requirements by almost three orders of magnitude compared with silica fibers. Also, silica is a particularly bad non-linear material; materials used in integrated optics typically have Kerr coefficients almost three orders of magnitude larger than silica. Putting both of these facts together, one needs to propagate a 5 mW peak power signal for ≈1 m in order to achieve self-induced non-linear phase shift of π, 1 m is clearly way too long to be used in integrated optics.

An additional mechanism that can be explored to boost non-linear effects is to use waveguides with small group velocity; it has been shown that for a fixed power, the length requirements are proportional to $(v_G/c)^2$, where $v_G$ is the group velocity of the signal in the waveguide. Using a GaAs waveguide with $v_G$=c/100, modal area $(\lambda/3)^2$, and 5 mW peak-power signals, a self-induced non-linear phase shift of π can be obtained after a propagation distance of ≈1 mm.

SUMMARY OF THE INVENTION

According to one aspect of the invention, there is provided a photonic crystal system. The photonic crystal system includes a microcavity inside it. The photonic crystal structure is doped with materials that exhibit electromagnetic induced transparency (EIT) so as to increase the non-linear properties of the photonic crystal.

According to another aspect of the invention, there is provided a method of forming a microcavity structure inside of a photonic crystal, which is doped with materials that exhibit electromagnetic induced transparency (EIT) so as to increase the non-linear properties of the photonic crystals.

BRIEF DESCRIPTION OF THE DRAWINGS

FIG. 3A is a schematic diagram of a photonic crystal cross-connect system; FIG. 3B is schematic diagram illustrating the excited modes of the cross-connect system;

DETAILED DESCRIPTION OF THE INVENTION

Photonic crystals are particularly suitable for implementation of various structural non-linearity enhancement schemes. Photonic crystals are artificially created materials in which index of refraction varies periodically between high-index and low-index values. Any light of wavelength comparable to the periodicity of the photonic crystal is not allowed to propagate inside it. In particular, photonic crystals have so-called photonic band-gaps; any light with frequency inside a bandgap is not allowed to propagate in the material, while the frequencies above and below the bandgap are allowed to propagate freely inside the crystal. This is reminiscent of electronic band-gaps for electrons propagating in semi-conductors. Photonic crystals therefore present for photons a material very similar to what semi-conductors present for electrons. Since semi-conductors led to integration of electronics, photonic crystals are considered to be the most promising candidate to enable large-scale integration of optics.

If one starts with a uniform photonic crystal and creates a line defect inside it, under proper circumstances one obtains a structure that guides light along the defect, but nowhere else. The light is typically tightly bound to the defect, so this way a small modal area photonic crystal waveguide is created. Waveguides inside photonic crystals can readily be made to have small group velocities and/or small dispersion. Furthermore, point-defects that support localized states can also be created inside photonic crystals.

Figure 2:
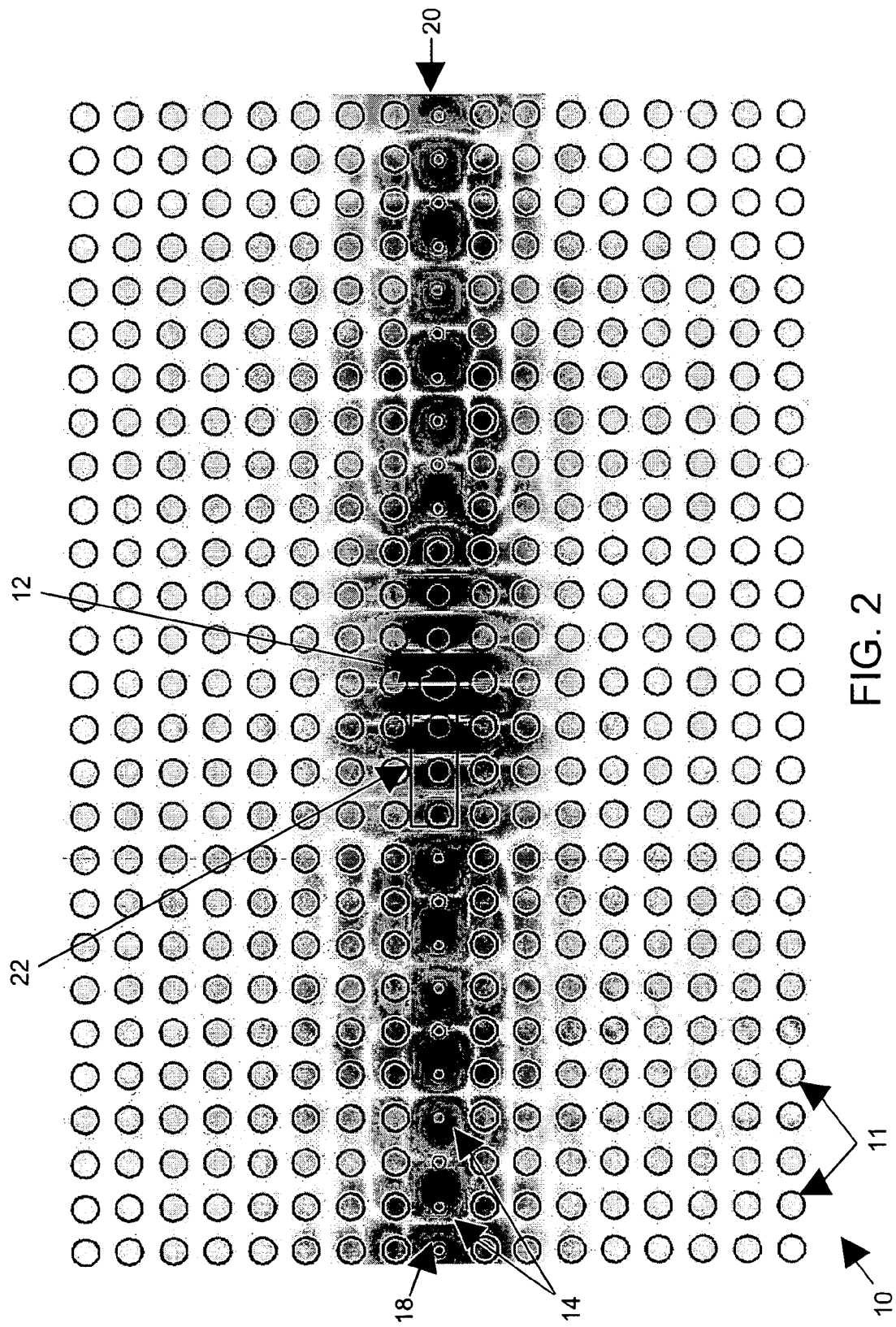
FIG. 2 is a schematic diagram of a photonic crystal all-optical switch at 100% resonant linear transmission.

Combining these ideas, one can create resonant cavities inside photonic crystals, like in FIG. 2, which shows a 2D photonic crystal 10 of high index rods 11 embedded into low-index material, with electric field parallel to the rods 11. The resonant cavity 12 in FIG. 2 consists of a point defect 12, which is created by increasing the radius of the central rod 12 of the structure, so it supports a dipole-type mode. The point defect 12 is coupled through tunneling to two line defects 18, 20, which are created by decreasing radii of all rods 14 in a line that act as the incoming 18 and outgoing 20 waveguides. If one starts with some light inside the cavity 12, it slowly leaks out into the two waveguides 18, 20; the more rods 22 in the "walls" of the cavity 12, the slower the decay rate.

Suppose now that instead of starting with light inside the cavity, a signal is sent down the waveguide on the left towards the cavity. The system 10 of FIG. 2 is effectively 1D (the two waveguides 18, 20 are single-mode, and they couple to a single mode of the cavity), and left-right symmetric. Because of this, there is a theorem that says that a carrier frequency of the signal can always be chosen such that 100% transmission of the signal from waveguide 18 into the waveguide 20 is observed. Namely, if the carrier frequency of the signal is the same as the resonant frequency $\omega_{RES}$ of the cavity 12, 100% transmission was observed. In particular the transmission curve has a Lorentzian shape in terms of carrier frequency $\omega$: $T(\omega) \equiv P_{OUT}(\omega)/P_{IN}(\omega) \approx \gamma^2/[\gamma^2 + (\omega - \omega_{RES})^2]$, where $P_{OUT}$ and $P_{IN}$ are the outgoing and incoming powers respectively, and $\gamma$ is the width of the resonance. The quality factor of the cavity is defined to be $Q = \omega_{RES}/2\gamma$, the more rods 22 in the "walls" of the cavity 12, the narrower the transmission width $\gamma$, and the larger the quality factor Q.

If Q is large, the device of FIG. 2 can be used as a narrow band-pass filter. Moreover, if one has some means of externally controlling the index of refraction of the cavity, for example, thru thermal, electrical, or optical stimuli, then inducing only a small index change is sufficient to move the device off the resonance. Therefore, this device 10 can also be used as a very efficient externally controlled on-off switch. Nevertheless, the system of FIG. 2 has even more advantages if one considers what happens when the signal itself self-induces the non-linear index change of the cavity 12. It has been shown that the device 10 can be used for: all-optical pulse reshaping, as an all-optical AND gate, all-optical amplification, etc. Despite the fact that it occupies only a tiny volume ($<\lambda^3$), and that it can be ultra-fast (used with >10 Gbit/s signals), the device 10 can operate with as little as 4 mW peak power when implemented in GaAs. Therefore, the devices of this class are optimal with respect to the structural enhancement of non-linear effects.

An example of a structure that is similar to arrangemnet shown in FIG. 2 is shown in FIG. 3A. The central large rod 34 supports two degenerate dipole modes. As shown in FIG. 3B, any signal coming from waveguide 26 couples only to the mode of the cavity that is odd with respect to the left-right symmetry plane. The reason for this is the fact that the waveguide 26 supports only a single mode, which is even with respect to the up-down symmetry plane. Consequently, it can couple only to the mode of the cavity that is even with respect to the up-down symmetry. However, once excited, that particular mode can decay only into waveguides 26 and 30 since it is odd with respect to left-right symmetry, while the guided modes in waveguides 28 and 32 are even with respect to that symmetry. As a consequence, any signal propagating in waveguides 26 and 30 never gets coupled into waveguides 28 and 32 and vice-versa. Using this approach, one can build great cross-connects in photonic crystals, which should be quite useful when building integrated optics circuits.

The non-linear properties of this device 24 make it also quite useful for all-optical signal processing. Applying a strong signal in waveguides 28, 32, with the carrier frequency resonant with the cavity 34, the index of the defect can be controlled, and thereby the resonant frequency of the cavity 34. Consequently, one has control over whether a small signal propagating in the waveguides 26, 30 can propagate across the cavity 34. Due to the different sizes of "walls" seen by the waveguides 26, 30 versus the "walls" seen by the waveguides 28, 32, the quality factor of waveguides 28, 32 direction $Q_{28,32} < Q_{26,30}$.

Because of the differing widths of the two pass-bands, it is possible to engineer that the signal 40 makes the cavity opaque for the signal 38, while it stays mostly transparent for the signal 40. Since the signal 40 drives the resonant system at its resonant frequency, this leads to energy accumulation in the cavity 34; the relation between the incoming power $P_{28,32}$ and the energy stored in the cavity U is given by: $U = Q_{28,32} P_{28,32}/\omega_{RES}$. Since the non-linear effects depend on the energy stored in the cavity 34, the larger the $Q_{28,32}$, the less power is needed. Physically, the signal 40 makes $O(Q_{28,32})$ bounces inside the cavity 34 before it proceeds towards the output. Consequently, the intensity inside the cavity 34 is $O(Q_{28,32})$ larger than in the waveguides 28, 32; to obtain a given non-linear index change one needs $O(Q_{28,32})$ less power compared with the schemes that do not exploit cavities.

Next, note that the only region where the non-linear index change occurs is the cavity 34 itself. Since the induced $\delta n \propto U/V$, where V is the modal volume, the smaller the modal volume, the less energy (and hence power) is needed. Having modal volumes as small as $O((\lambda/3)^3)$, the photonic crystal cavities are superior to other non-linear schemes where the non-linear index change is induced in much larger volumes. Finally, one can show that the non-linearly induced index difference of the cavity $\delta n$ changes the resonant frequency of the cavity as $\delta n/n \cong -\delta\omega_{RES}/\omega_{RES}$. In order to switch the signal 38 on-off, the capability to move the resonance by $\delta\omega_{RES}/\omega_{RES} \geq 1/Q_{26,30}$ is needed, the larger the $Q_{26,30}$, the smaller $\delta n$ is needed to implement the switching. Physically, since the signal 38 bounces back-forth inside the cavity $O(Q_{26,30})$ times before it escapes, the system is very efficient since it makes use of the same non-linear effect $O(Q_{12})$ times by "recycling" it. Putting all this together the power requirements of the system from FIG. 3A is shown to be $\propto V/(Q_{26,30} Q_{28,32})$. Since quality factors in photonic crystal cavities can be very large (O(1000) or more), the power needed to operate the devices of this class can be made very small. In fact, the real physical limit to this scheme typically comes from the fact that the pass-band of the cavity has to be broader than the band-width of the signal (for a 10 Gbit/s signal this limits Q<8000).

It is important to emphasize that in practice, one will actually work with a 3D photonic crystal system. Recently, however, a new 3D photonic crystal structure has been introduced that can closely emulate the photonic state frequencies and field patterns of 2D photonic crystal systems. In particular, cross sections of all localized modes in that system are very similar to the profiles of the modes described herein. Therefore, the invention can be constructed in 2D, keeping in mind that the underlying physics is not specific to the field patterns in any case.

In the invention, the extraordinary non-linear material properties of EIT are combined together with the superior structural properties of cavities in photonic crystals, in order to create non-linear systems with non-linear sensitivity many orders of magnitude larger than in any other currently existing system. The focus is on EIT in solid-state materials (as opposed to gases) since they are highly preferable from the point of view of manufacturing; also they are expected to be easier to work with experimentally.

To illustrate the power of the invention, consider the system of FIG. 2, with $Q_{24} = Q_P = 1000$. Here, $Q_{24}$, and $Q_P$ are the quality factors as perceived by $\omega_{24}$ and $\omega_P$ respectively, when EIT dispersion is not present. Imagine that the central rod is doped with a single EIT atom. Consider for example the 3-beam system 50 shown in FIG. 4.

Figure 1A:
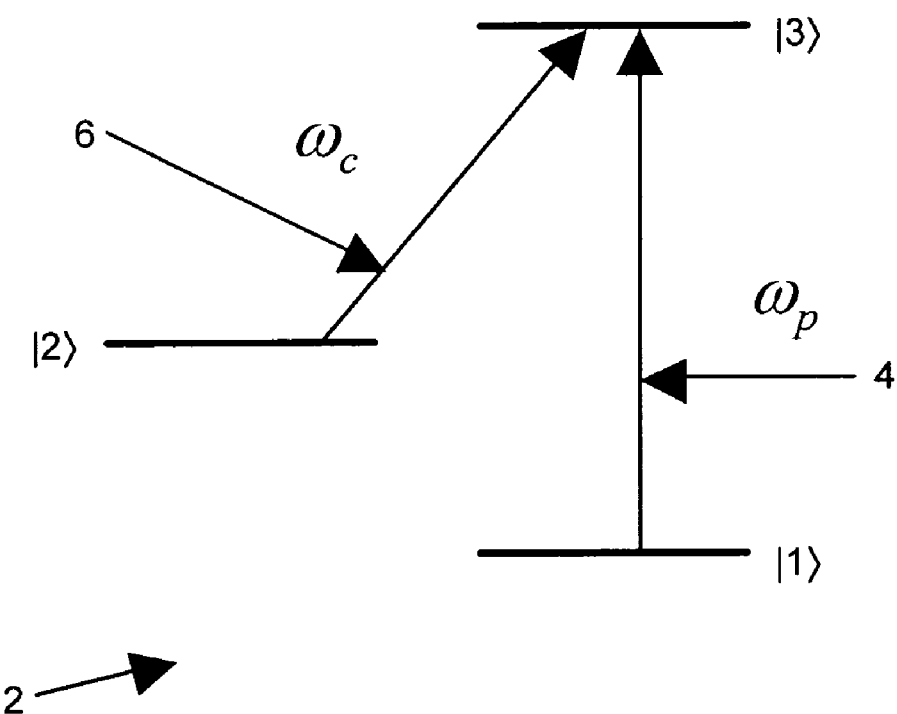
FIG. 1A is a schematic diagram of an EIT system.
Figure 4:
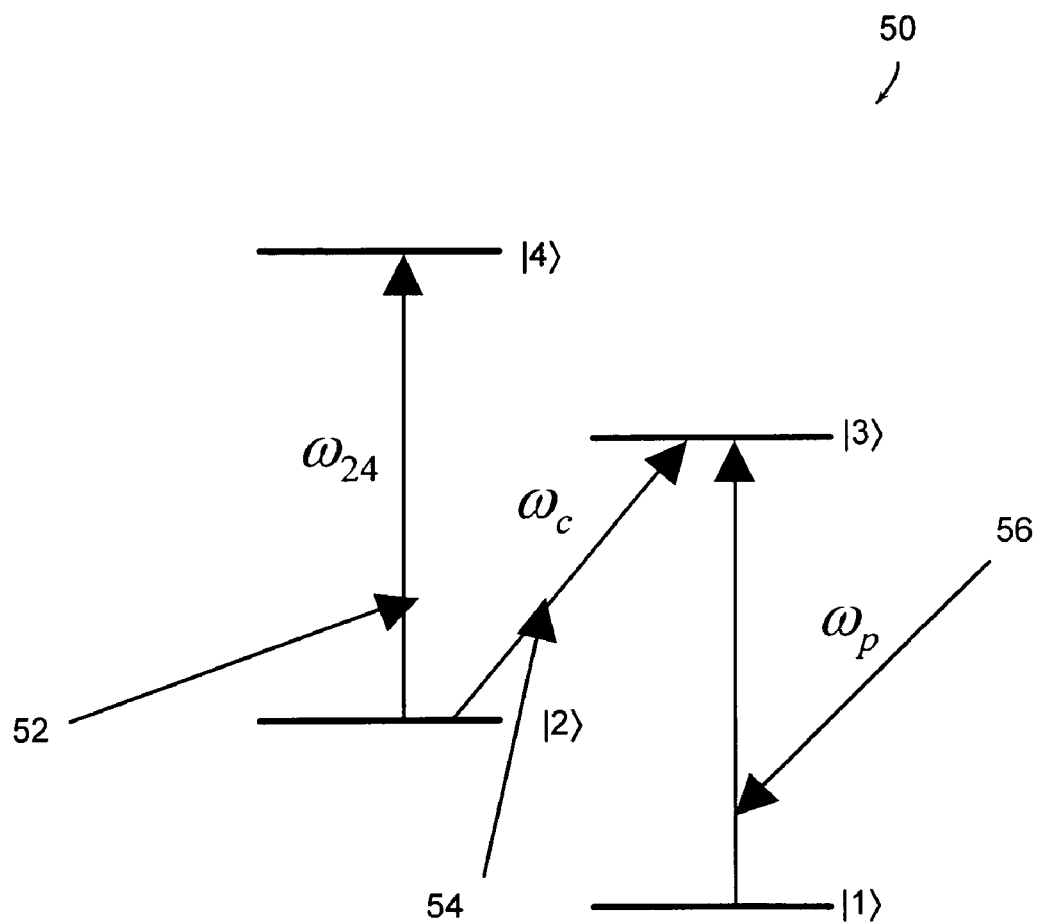
FIG. 4 is a schematic diagram of the EIT system which is used to exhibit non-linear switching.

FIG. 4 is a schematic of an EIT system 50 which is used to exhibit non-linear switching. The system 50 is initially in state |1>. The beam with frequency $\omega_{24}$ is resonant with the transition |2>→|4>; when it is not present, the system is the same as the system 2 of FIG. 1A. However, if it is present and strong enough, it induces the Stark shift of state |2>, moving $\omega_p$ off the cavity resonance, prohibiting transmission of $\omega_p$ through the cavity 12.

For most atomic systems, it is easy to choose levels so that $\omega_p$, $\omega_c$, and $\omega_{24}$ are sufficiently close to each other that they all fit comfortably within the pass-band of the device so that they are all at the same time nearly resonant with the cavity resonant frequency. All the beams 52, 54, and 56 are chosen to be polarized parallel to the rods, and propagating from left to right in FIG. 2.

However, since in the scheme of FIG. 2, all three frequencies would be co-propagating, and of the same polarization, if the frequencies are too close to each other, one has to worry about how to distinguish them at the output. Frequency differences bigger than a few GHz should be resolvable with standard photonic crystal based filter designs, but for smaller frequency differences, more sophisticated techniques might have to be used. Alternatively, if one uses waveguides that allow for propagation of both linear polarizations, one of the fields could be made linearly orthogonally polarized to the other fields, and could be distinguished this way.

Now, $\omega_p$ is also resonant with an electronic transition of the system, so when the probe beam 56 is the only beam present, it cannot get transmitted through the cavity 12. When the coupling beam 54 is turned on, both $\omega_c$, and $\omega_p$ observe 100% transmission. Note that due to the large Q, both $\omega_p$, and $\omega_c$ bounce back and forth the cavity many times before exiting the cavity 12; consequently, the same EIT atom gets "reused" many times thereby providing an effectively large optical density. Next $\omega_{24}$ is slowly turned on, this beam 52 exhibits 100% transmission, but its intensity is amplified inside the cavity 12 (due to the energy accumulation effects) compared to the intensity outside the cavity 12.

Figure 1B:
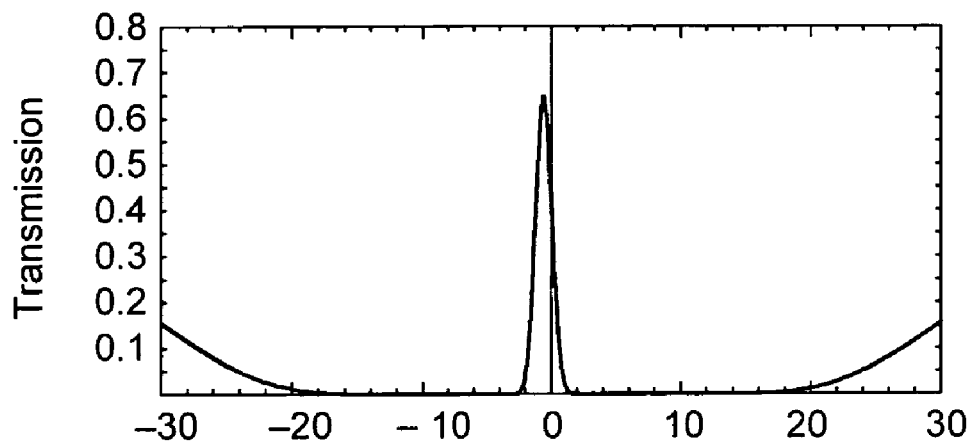
FIG. 1B is a graph illustrating absorption as a function of $\omega_p$ when $\omega_c$ is present.

As the intensity of $\omega_{24}$ is slowly increased, the transmission of $\omega_{24}$, and $\omega_c$ is not influenced, but due to the induced Stark shift of state |2>, the whole curve of FIG. 1B shifts sideways. As a consequence, the index of refraction of the cavity (as observed by $\omega_p$) changes; this moves $\omega_p$ off the cavity resonance, and as the index change becomes $\geq O(1/Q_P)$, $\omega_p$ is mostly reflected (rather than being transmitted through) from the cavity.

Let us now estimate how much power needs to be applied in $\omega_{24}$ in order to switch the beam $\omega_p$ off, if it observes 100% transmission when $\omega_{24}$ is off. In order to do this, the so-called XPM-Kerr coefficient is needed which is defined as $\delta n(\omega_p) = n_2^{XPM} * I_{24}$, where $\delta n(\omega_p)$ is the index change observed by $\omega_p$ (induced by $\omega_{24}$), $I_{24}$ is the intensity of $\omega_{24}$, and $n_2^{XPM}$ is the cross phase modulation (XPM) Kerr coefficient. $n_2^{XPM} = 0.18$ cm$^2$/W has been experimentally observed; the only major difference (as far as $n_2^{XPM}$ is concerned) between the inventive system, and the system of that particular observation being the EIT-atom density. Since the EIT-atom density in the current system is $\approx 1/((\lambda/3)^3) \approx 1.3 * 10^{14}$ cm$^{-3}$, $n_2^{XPM} \approx 0.3$ cm$^2$/W. Using this $n_2^{XPM}$, it is predicted that the $P_{24}$ needed to switch $\omega_p$ off is: $P^{24} \approx 3 * 10^{-15}$ W. In fact, since these power levels are so small, one has to consider the effect of ground-state quantum fluctuations (and also thermal fluctuations) of the $\omega_{24}$ field on the system.

A brief derivation of such power levels is as follows. First, the index change needed to switch $\omega_p$ off the resonance is $\delta n >> 1/Q_P$, where $\delta n >> n_2^{XPM} c \epsilon_0 |E_{24}^{MAX}|^2$, where $E_{24}^{MAX}$ is the peak electric field amplitude of the field $\omega_{24}$. On the other hand, the total $\omega_{24}$ energy stored in the cavity is given by $U_{24} >> \epsilon_0 V_{24} |E_{24}^{MAX}|^2$, where $V_{24}$ is the modal volume of field $\omega_{24}$. Given that the power of $\omega_{24}$ is $P_{24} = U_{24} \omega_{24} / Q_{24}$, the required power to operate the switch is $P_{24} >> V_{24} \omega_{24} / (c Q_{24} Q_P n_2^{XPM})$. A combination of small modal volume large Qs, and large $n_2^{XPM}$ make the inventive systems ultimately efficient.

The rigorous derivation is quite a bit more involved. Sometimes, in similar systems even new un-expected features appear like the photon-blockade effect. Nevertheless, the simple derivation of the kind shown herein can always be used to give the correct order of magnitude power estimate needed to observe the effect in question. Effectively, using the photonic crystal cavity reduced the power requirements by roughly 3 orders of magnitude, and length of the system by >3 orders of magnitude compared to what is usually needed in integrated optics.

Additionally, using EIT as the non-linear medium increased the Kerr coefficient by 12 orders of magnitude compared to the values usually used in integrated optics devices. To put in perspective how small this power really is, note that $10^{12}$ of such devices can be operating in parallel on the same chip, and still consume only 1 mW of power. Furthermore, implementing any all-optical operation needed in telecommunication networks should be significantly easier now. Finally, it is possible to calculate how many $\omega_{24}$ photons are needed to switch $\omega_p$ on-off.

To estimate this, the energy $U_{24} = P_{24} Q_{24} / \omega_{24}$ that needs to be present inside the cavity in order to prevent $\omega_p$ from getting through is calculated. On the other hand, $U_{24} = n_{24} \hbar \omega_{24}$, where $n_{24}$ is the number of $\omega_{24}$ photons inside the cavity at any given time, which implies $n_{24} \approx 4 * 10^{-10}$ photons. Clearly, this is 10 orders of magnitude better than what is needed to perform all-optical quantum information processing.

Note that instead of the switching scheme illustrated herein, where $\omega_{24}$ induces a change of the refractive index seen by $\omega_p$, thereby making $\omega_p$ off-resonant with the cavity, one can alternatively make use of the absorptive scheme of FIG. 1B. Consider the situation when the intensity of $\omega_{24}$ is strong enough to shift the top curve of FIG. 1B sideways all the way into the strongly absorptive regime for $\omega_p$. One might think that in that case $\omega_p$ will be strongly absorbed, and dissipated in the cavity. In contrast, $\omega_p$ becomes strongly off-resonant with the cavity, and most of its energy never enters the cavity; transmission of $\omega_p$ is nearly zero, but so is absorption.

One could instead simply turn $\omega_C$ off; in this (alternative) switching scheme, one would use the $\omega_C$ as a control beam to switch $\omega_P$ on/off ($\omega_{24}$ would thus not be needed).

From the point of view of ease of fabrication, ease of manufacturing, and reliability in commercial use, the solid-state implementation of the EIT photonic crystal cavity system, is highly preferred to other EIT (e.g. gases) systems. The photonic crystal systems are doped with atoms that can serve as EIT media. Once an EIT-atom is inside its host, it acts very much like a free atom, except that it observes a strong local electrical field (due to the host) that it would not observe if it were free. As a consequence, its energy levels differ from what they would be if the same EIT-atom were free. Moreover, the degeneracy of each hyperfine state is now broken.

Since each EIT-atom sees a surrounding that is a bit different, the levels of each atom are different. One can think of it as each EIT-atom seeing an electric field of a different magnitude and pointing in a different direction in space. When this doped material is observed from outside, it appears as the levels due to the EIT-atoms are significantly broadened. This effect is one particular kind of what is called "inhomogeneous broadening". The size of inhomogeneous broadening strongly depends on the system; it can be fairly large in some systems (>$1/10^3$ of the level in question), or fairly small in some others (<$1/10^5$ in Pr doped YSO).

Unfortunately, since the levels of each atom are different, if a good EIT is established for one atom, the EIT conditions will not be met for most surrounding EIT-atoms; because of these other EIT-atoms, $\omega_p$ will suffer huge absorption. The only way to prevent this is to establish techniques that will make the beams $\omega_p$, $\omega_c$, $\omega_{24}$ effectively "see" only a certain kind out of many EIT-atoms inside the material. Some of these techniques are more suitable for implementation in certain geometries than in others. Finally, since photonic crystals are typically highly polarization dependent, in contrast to the gaseous EIT systems, there is less control over what polarization to excite the atoms with.

One option to implement the needed doping is that instead of the usual way of producing doped materials (during the production of the structure), one produces the photonic crystal structure in the usual way, made from the pure host material, but then dopes only the center of the cavity with a single EIT-atom. Presumably, this could be done with techniques similar to scanning tunneling microscope (STM). The advantage of this scheme is that one does not have to worry whether the beams will see other EIT-atoms (for which an efficient EIT has not been established). Since there is only a single atom present, this is not an issue any more; it is necessary that a good EIT is established for the single atom present.

Establishing good EIT for this particular atom is somewhat of a problem since there is a high degree of uncertainty (due to inhomogeneous broadening) as to where its levels really are. Consequently, whole range of possible frequencies will have to be scanned in search of good frequencies for the particular system. This approach is sufficient for experimental purposes, but probably too restrictive for applications, since such device cannot be integrated with other similar devices on the same chip. To see this, note that the frequencies for which EIT can be established are different for each device, so these devices cannot be piggy-backed to each other. If the inhomogeneous broadening is not too large, one can envision establishing some external control, like a strong external electrical field or such, for each individual device that would allow for tuning of the levels of each individual device. Alternatively, if one designs the system to work with broad bandwidth signals so their bandwidth is sufficiently larger than the inhomogeneous broadening, then the applied fields are anyway strong enough to mask the uncertainty in the exact position of levels. There will be further discussion of this hereinafter.

Another doping technique is not nearly as stringent as the one discussed above. It involves producing the structure and doping only the cavity, but with many atoms. Let us denote the width of the inhomogeneous broadening with $\Delta\omega_{IN}$, and suppose there are N EIT-atoms in the cavity. Therefore, the average spacing between levels of two different atoms in the cavity is given by $\Delta\omega_{IN}/N$. Clearly, it is possible to accidentally have two atoms that have level spacings much smaller than this, but on average the spacing will be given by $\Delta\omega_{IN}/N$. Denote by $\Delta\omega_{MAX}$ the larger of the Fourier spectra of $\omega_p$ and $\omega_c$. In that case, as long as $\Delta\omega_{MAX}$ is sufficiently smaller than $\Delta\omega_{IN}/N$, the signals effectively see only a single atom per "channel" of interest unless, of course there are two atoms that have spacings very close by, (which is very unlikely when $\Delta\omega_{MAX}<<\Delta\omega_{IN}/N$). Clearly, the exact knowledge of N is not needed; it is sufficient that N is small enough to satisfy the requirement.

The problem discussed above could be mitigated if the inhomogeneous broadening of $|\omega_c-\omega_p|$ is small compared to the EIT bandwidth, so all atoms have the two-photon resonance within the EIT window. (Note that there are many systems in which the inhomogeneous broadening of $|\omega_c-\omega_p|$ is much smaller than the inhomogeneous broadening of each individual level: $\omega_p$ or $\omega_c$. Also note that there might be additional constraints on various level spacings, especially if the fields cannot be distinguished based on their polarization and/or propagation direction.) Since one is not any longer restricted to dope the cavity with exactly a single atom, such structures should be significantly easier to build compared to the single-atom structures described before. Unfortunately, it seems that most likely in this scheme also each individual device needs to be tuned separately, if integration with other devices is desired. But, the amount by which the levels need to be tuned is reduced by a factor of N compared to the previous scheme discussed before. The required doping can also be implemented with STM-related techniques.

However, one should also be able to implement the doping with lithography techniques. Suppose that one uses lithography, either electron-beam lithography, or X-ray lithography, to build the photonic crystal. When one is done building the layer in which the cavity is, one could deposit an additional layer of a different (but very weakly EIT-atom doped) material, and then etch this layer away everywhere except at the cavity. Since the volume of the cavity is so small, the density of the EIT-atoms in the host medium should not be prohibitively too small to prevent the usual doping techniques, for example, the usual vapor deposition, with the partial pressure of EIT-atoms moderately small should do the job.

It is important to point out a well established technique that allows one to observe EIT in any EIT-atom medium. In our case, only the cavity would be doped, with any of the techniques mentioned herein, but now with an arbitrary (large) number of EIT-atoms. One starts with applying $\omega_p$, and $\omega_c$ to the medium; because of optical pumping, the medium soon becomes transparent to both of these beams, thereby preventing further absorption and EIT. Next, one applies a narrow band-width auxiliary beam $\omega_A$, that creates an absorbing "antihole" (effectively, it "de-pumps" only those EIT-atoms in the medium that have the levels very close to $\omega_A$). This way, out of many EIT-atoms, all with different levels, the only ones that are effectively seen by the probe beam are the ones that have the levels of exactly the needed difference to match $\omega_p$. Since this technique does not require subsequent tuning of each individual device separately to make them all work with exactly the same frequencies, it might be preferred from the point of view of integration with other similar devices.

Geometries that offer most design flexibility are the ones that are implemented in a 3D photonic crystal with a complete photonic band-gap since in that case all the modes are perfectly confined and numerous options for implementing various schemes are possible. For example, implementing a system that looks very much like the ones in FIG. 2, or FIG. 3A should be trivial. Using a photonic crystal that can be built layer-by-layer significantly eases production, and doping with EIT-atoms. Unfortunately, such structures are not yet experimentally accessible at the moment, although they should be accessible soon. Furthermore, once they are accessible, it will take some time to establish expertise in dealing with them. Nevertheless, it is expected these structures to ultimately be the best framework for implementation of the invention.

Figure 5:
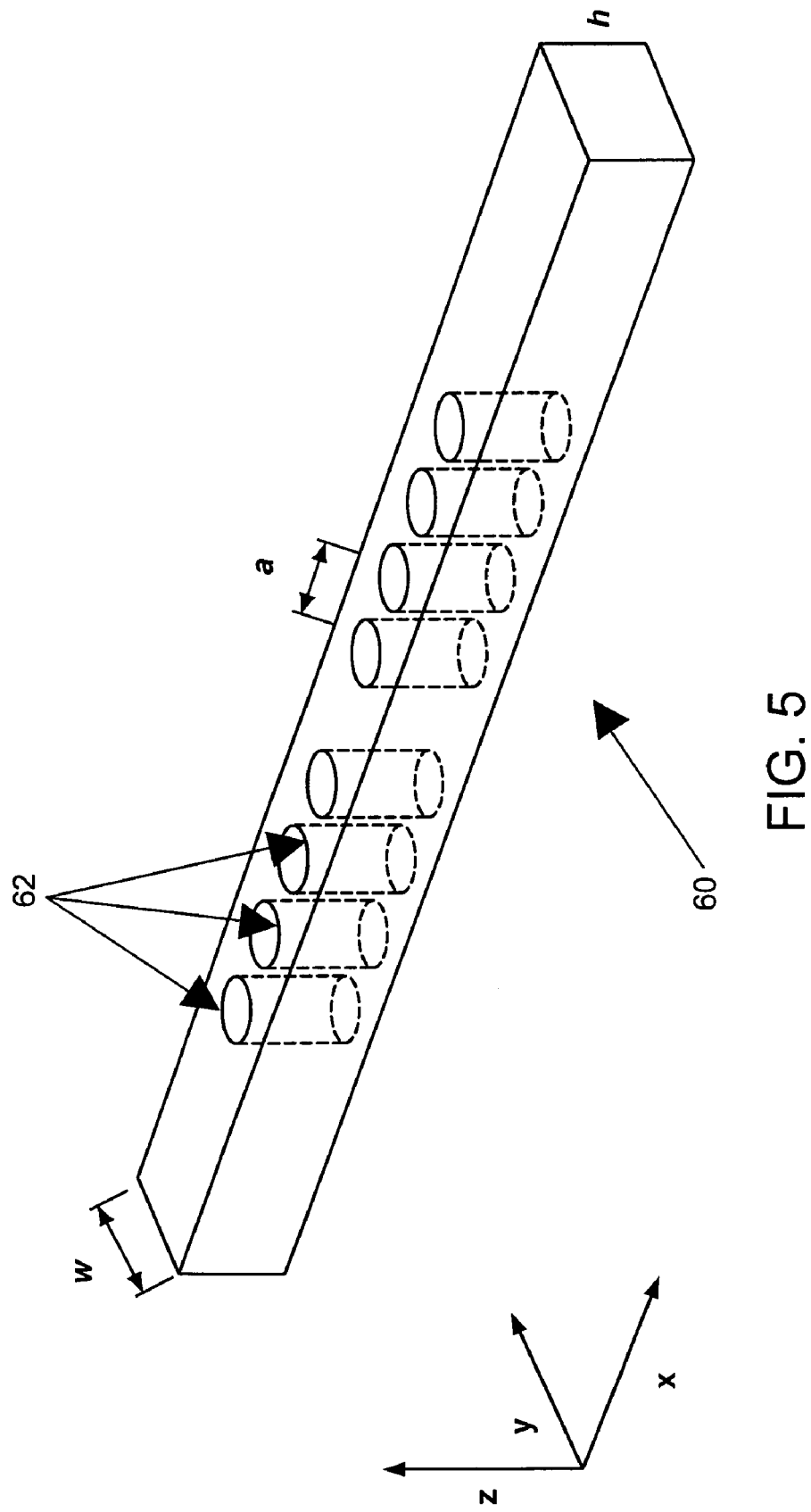
FIG. 5 is a schematic diagram of an air-bridge structure.

Although 3D photonic crystals are not available yet, many hybrid schemes have been built experimentally, and they often provide a sufficiently powerful framework to implement most tasks successfully. These schemes are typically 1D or 2D photonic crystals in which photonic crystal controls the light in one or two directions respectively. In the directions transverse to these, the light-guiding principle is the usual high-index guiding. FIG. 5 shows an example of such a system.

In particular, FIG. 5 illustrates an air-bridge structure 60 that is a high-index structure surrounded by air. Photonic-crystal confinement of the cavity mode is implemented in the x-direction, while the confinement in y and z directions is provided by the high index contrast. Note that photonic crystal elements 62 are separated by a distance a in the x-direction, and the air-bridge structure has a width w and thickness h. The cavity mode is unfortunately coupled to the radiation manifold (outside of the structure), so a fraction of light is always lost to radiation; this presents losses in such a system. Nevertheless, there are well-understood techniques to minimize these kinds of losses. But, even without implementing these techniques, such losses are typically small; for example, a closely-related monorail structure was recently built experimentally, in Si/SiO$_2$ system with a=0.42 μm, w=0.47 μm, h=0.2 μm; the measured Q for it was Q=265, peak transmission was 80%, while the modal volume was $\lambda^3$/68, where $\lambda$=1.54 μm. These parameters are more than sufficient to implement the schemes proposed in this invention.

Figures 6A, 6B:
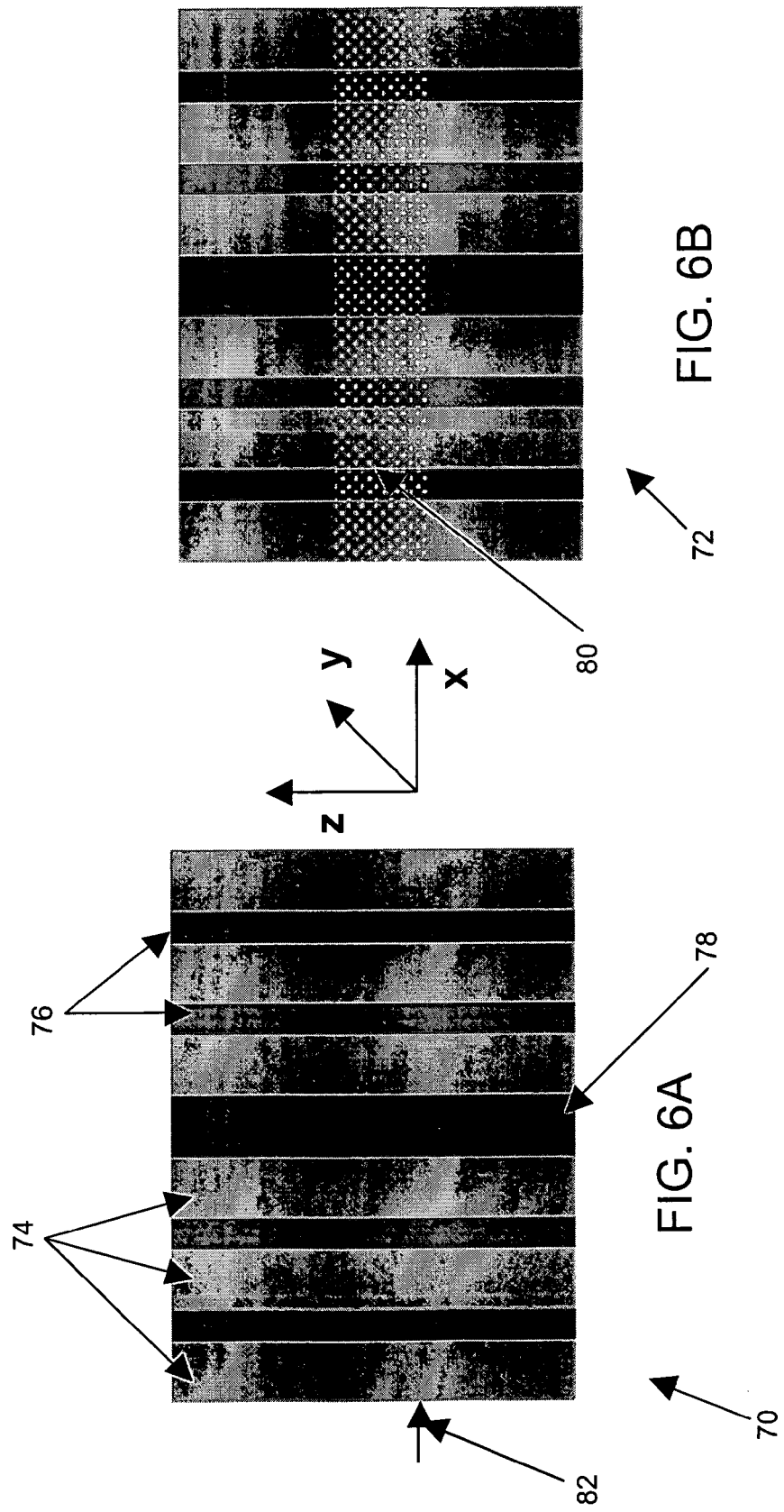
FIGS. 6A–6B are schematic diagrams illustrating a multilayer embodiment of the invention.

Another structure, very attractive from the point of view of fabrication is the simplest 1D photonic crystal structure: a multi-layer film. FIG. 6A shows a schematic of such a multi-layer film 70. The film 70 includes layers 74, 76 of low and high indexes, respectively, and differing thicknesses. The central (defect) layer 78 is doped with EIT-atoms. All the beams are propagating in the x-direction. The structure 70 is uniform in yz-plane. The structure 72 of FIG. 6B is similar to that of FIG. 6A except it shows a dotted region 80 that denotes the fact that the index of refraction is slightly increased locally (for example, Δn<0/01) compared to what it was initially. Moreover, the film structures 70 and 72 are cylindrically symmetric around the x-axis.

One would excite such a structure 70 with a Gaussian beam 82 propagating along x-axis, focused so its minimum waist D occurs inside the defect layer 78. The beam 82 will diffract while it is in the cavity. However, as long as Qλ, which is roughly the "distance" propagated by bouncing back-forth in the cavity 70, is reasonably smaller than the diffraction length $D^2/\lambda$, this diffraction can be ignored; for all practical purposes, the beam then behaves essentially as a plane wave. The modal area is now O(10Q) bigger than for the schemes proposed above; assuming Q=1000, the switching power is O($10^{-11}$ W), and the number of photons needed to do the switching is O($10^{-6}$).

Clearly, the system can afford to be this much "wasteful" with power given the ease of manufacturing of the device 70 shown in FIG. 6A. This device 70 can be built by simple vapor deposition. The defect layer 78, can be doped with EIT-atoms via STM-related techniques. But, even better, the defect layer 78 can also be doped with EIT-atoms in the usual way: a small concentration of EIT-atoms is released into the vapor-chamber.

The maximum acceptable density ρ of EIT-atoms will be calculated below. The variable $\Delta\omega_{IN}$ denotes the width of the inhomogeneous broadening, and suppose there are N (≈ρD$^2$d) EIT-atoms in the modal volume of interest, where d is the thickness of the defect layer. (As mentioned in herein, if the inhomogeneous broadening of $|\omega_c-\omega_p|$ is made small compared to the EIT bandwidth, so all atoms have the two-photon resonance within the EIT window, the problem from inhomogeneity is mitigated; in Pr:YSO, this inhomogeneous broadening is smaller than 100 kHz.) The variable $\Delta\omega_{MAX}$ denotes the bigger of bandwidth of $\omega_p$ and $\omega_c$. Since typically, $\Delta\omega_{MAX}\geq$100 kHz, the inhomogeneous broadening of the two photon resonance $|\omega_c-\omega_p|$ should be well within the required EIT bandwidth.

As long as $\Delta\omega_{MAX}$ is sufficiently smaller than $\Delta\omega_{IN}$/N, the signals effectively see only a single atom per "channel" of interest. For Pr:YSO $\Delta\omega_{IN}\approx$5 GHz, assuming λ=500 nm, d=250 nm, and Q=1000, the value ρ<$10^{15}$ cm$^{-3}$ is obtain which is not a very challenging value to implement. In fact, if the doping density is reduced even more, so that there is on average only a single atom per modal volume, the inhomogeneous broadening to make only a single EIT-atom visible to the beams is not needed to be relied on. Alternatively, if the system is dealing with broad bandwidth signals, then the strength of the coupling field will necessarily be strong enough to "mask" all inhomogeneous broadenings, making them effectively "invisible" to the EIT beams.

In order to have a better control over the beams, and also to prevent the diffraction of the beams once they are inside the defect layer, a low-index contrast waveguide 80 is produced inside the structure 72, as shown in FIG. 6B. Stopping diffraction allows us to decrease the modal area. The structure 72 created this way is actually of a very similar type to the one in FIG. 5, except that the transverse guiding 80 is now low-index contrast, rather than being high-index contrast guiding as in FIG. 5. The disadvantages of the multi-layer structures are that they require larger powers, which is quite acceptable in our case as far as most applications are concerned, and that they are not as easily integrable as photonic crystal devices are.

However, multi-layer devices are significantly easier to produce, and to couple light in-and-out of (one would use free space optics for this). The last, but not the least, is the fact that due to the rotational symmetry of the multi-layer films, these devices are inherently polarization-insensitive, which is of crucial importance in telecommunications. Furthermore, one is not forced to use only linearly polarized beams anymore; for example, all the beams can be circularly polarized in this scheme.

Before proceeding, it is worth pointing out that field inside a photonic crystal cavity is typically far from being spatially uniform; more commonly, the field envelope varies on scales comparable to the wavelength. On the other hand, in most schemes presented thus far, one will not know exactly where is the EIT atom of interest placed inside the cavity. Consequently, the exact field amplitudes experienced by the atom will not be known before the experiment. Since most applications, e.g. switching, or all-optical logic, of interest are digital in nature, not knowing the exact fields will not cause problems. However, if there are (commercial) applications for which this feature is undesirable, it can be remedied to a great extent by purposely designing photonic crystal cavities that have field amplitudes nearly uniform in the regions where EIT atoms are most likely to be found.

Apart for the schemes of FIGS. 6A–6B, all other proposed schemes discussed herein are likely to be highly polarization sensitive. It is a fairly general property of photonic crystals that they are very polarization sensitive; in fact, quite often one of the polarizations is in the photonic band-gap while the other one is outside of the band-gap. In such systems, using circularly polarized light, in addition to exploring selection rules, in order to prevent undesirable talk between some of the levels is not an option any more. Instead one has to live with the fact that all the fields involved will have to be linearly polarized. This issue will need to be addressed for each particular system separately, but in general, it is not expected that it would be a major obstacle. If needed, one could make double-lambda EIT systems that allow for the linearly polarized light. Alternatively, one can be careful to choose such set of Zeeman sub-levels of each hyperfine state so that the left-circularly, and right-circularly polarized components never talk with each other.

For example, consider only the fields $\omega_p$, and $\omega_c$. It is easy to generalize the scheme of this paragraph to the case when $\omega_{24}$ is also present. Imagine that state |1> has only two Zeeman sub-levels: $m_F=1$ and $m_F=-1$, state |2> has only two Zeeman sub-levels $m_F=1$ and $m_F=-1$, while state |3> only has Zeeman sub-levels $m_F=2$ and $m_F=-2$. Note that the Zeeman sub-levels of different $|m_F|$ of a given hyperfine state are split due to the local electrical field of the crystal. It should not be difficult to find a system in which the selection rules are such that left-circularly polarized component of $\omega_p$ couples only $|1,m_F=-1>$ with $|3,m_F=-2>$, while the right-circularly polarized component of $\omega_p$ couples only $|1,m_F=1>$ with $|3,m_F=2>$. Furthermore, the same system can be such that the left-circularly polarized component of $\omega_c$ couples only $|2,m_F=-1>$ with $|3,m_F=-2>$, while the right-circularly polarized component of $\omega_c$ couples only $|2,m_F=1>$ with $|3,m_F=2>$. In that case the linearity of the Schrodinger equation implies that the same atom provides a suitable medium for both the left, and the right-circularly polarized components of $\omega_p$, and $\omega_c$, at the same time, and that the two EIT processes that are present in the same system at the same time have no influence on each other.

For many important applications (e.g. telecommunication applications), it is highly desirable if the probe ($\omega_p$) and control ($\omega_{24}$) pulses are allowed to have a large bandwidth. For example, a 40 Gbit/sec signal at carrier wavelength 1.55 μm has 100 GHz bandwidth. The only two requirements that have to be met in order to have high-bandwidth performance is to have the coupling field large enough, and that the bandwidth of each particular signal must not be broad enough to interfere with any other close-by transition. For example, width of the probe pulse $\Delta\omega_p$ must satisfy $\Delta\omega_p < |\omega_p - \omega_c|$, $\Delta\omega_p < |\omega_p - \omega_{24}|$ etc. In order to satisfy this former requirement, EIT levels are chosen that have atomic levels that are mutually far enough from each other.

Lets first consider what values of Q might be desirable for implementation of the broad band-width systems. In the usual EIT pass-band for $\omega_p$, index of refraction is a strongly varying function of the frequency; it is precisely this feature that makes the group velocities small in EIT systems. However, according to the perturbation theory this also means that if $\omega_p$ is a resonant frequency of the cavity, $\omega_p + \Delta\omega_p$ is going to fall within the same resonance only as long as $1/Q_p \gtrsim n(\omega_p + \Delta\omega_p) - n(\omega_p) \approx \Delta\omega_p(dn/d\omega_p) \approx (\Delta\omega_p/\omega_p)(c/v_G) \rightarrow (1/Q_p)*(v_G/c) \gtrsim *(\Delta\omega_p/\omega_p)$, where $Q_p$ is the quality factor of the cavity as seen by $\omega_p$. In order to have EIT bandwidth, without photonic crystal being present, of 100 GHz at $\lambda$=1.55 μm, the effective $v_G$=c/30. Consequently, it is not beneficial to have $Q_p$ large in this case since large $Q_p$ reduces the available bandwidth. If self-induced influence of $\omega_p$ on itself is exploited, the small $Q_p$ requirement will lead to an increase in the needed power of $\omega_p$. Furthermore, note that $\omega_{24}$ does not see a sharp variation in the index, so the allowed bandwidth of $\omega_{24}$ is $\Delta\omega_{24}/\omega_{24} \approx 1/Q_{24}$. Of course, the fact that not all frequency components of $\omega_{24}$ are perfectly aligned with the transition $|2> \rightarrow |4>$ means that the needed power in $\omega_{24}$ needs to be increased in order to achieve the same strength of the XPM non-linear effect as in the CW case.

Unfortunately, as the bandwidth is increased, the efficiency of the EIT non-linear scheme drops. First of all, the coupling field needs to increase. This is not a big disadvantage since the coupling field is just a dummy field, except in the scheme where turning $\omega_c$ on/off is used for switching. Nevertheless, if this field is also made to be a resonant field of the cavity its effects will be enhanced compared to the free field propagation. Second, the $n_2^{XPM}$ non-linear coefficient is inversely proportional to the intensity of the coupling field. Third, one is not allowed to operate at very large values of $Q_p$, as explained in the previous paragraph. Last, part of the reason that $n_2^{XPM}$ can usually be so large is the fact that $\omega_{24}$ can be tuned very close to the $|2> \rightarrow |4>$ transition. If a large bandwidth in $\omega_{24}$ is needed, the detuning of $\omega_{24}$ from the $|2> \rightarrow |4>$ transition has to be at least as large as the desired operational bandwidth. Note however that $n^{2XPM}$ is inversely proportional to this detuning.

Each of the effects from the previous paragraph increases the operational power requirements. To consider how restrictive this fact is, lets estimate the required operational power if the system 10 is made to work for $\omega_{24}$, and $\omega_P$ bandwidths of 60 GHz. Let's assume the same $Q_P$=1000 as before, but now increase $v_G/c$ to $v_G/c \approx 1/10$ (so $\Delta\omega_P/\omega_P \approx 1/10000$). Furthermore, $\omega_{24}$ needs to be detuned by 60 GHz from the $|2> \rightarrow |4>$ transition, leading to a further decrease in $n_2^{XPM}$. Consequently, the operational power is $P_{24} \approx 5*10^{-6}$ W to operate the device. This power is roughly 3 orders of magnitude better than comparable photonic crystal schemes implemented in GaAs, and is still close to having a single $\omega_{24}$ photon being present in the cavity at any given time during the switching process.

Note that since large bandwidths are of interest here, the inhomogeneous Doppler broadening is too small to be relevant at room temperature. Even in gases, where each atom is free, so Doppler broadening is maximized, this broadening is typically smaller than 1 GHz; such small differences will be overcome by the large EIT bandwidth introduced by the large intensity of the coupling field.

The fact that the requirements are that the frequencies $\omega_{24}$, $\omega_p$, and $\omega_c$ all be significantly different from each other means that most likely they can not all "fit" within the same pass-band of the device. To circumvent this difficulty, the photonic crystal cavity can be engineered to support more than one resonant frequency at the same time, and that the resonant frequencies of the photonic crystal defect exactly correspond to the resonant frequencies of the EIT system. Such a goal is fairly easy to accomplish in photonic crystal systems. For example, consider the system shown in FIGS. 3A–3B. If the central defect elongated in the y-direction (instead of being circular), the two modes that it will support will have different resonant frequencies. Consequently, the resonant frequency observed by the signal propagating in the waveguide 26, 30 will be different than the one observed by the signal propagating in the waveguide 28, 32. Furthermore, it is not really necessary that all $\omega_p$, $\omega_c$, and $\omega_{24}$ observe the same large Q; depending on what is being achieved, it will usually be sufficient that only 1 or 2 of them fit within a mode of the cavity, and usually it will be sufficient that only a single one of them observes a large Q. For example, usually it will be acceptable that $\omega_c$, being just a dummy field, be shone on the system from a side. (Since the fields in the system of FIG. 3 are not co-propagating, the inhomogeneous Doppler broadening will prevent this system from functioning properly unless the coupling field is sufficiently large (and hence the bandwidths are large) and/or the temperature is sufficiently small.)

Figure 1C:
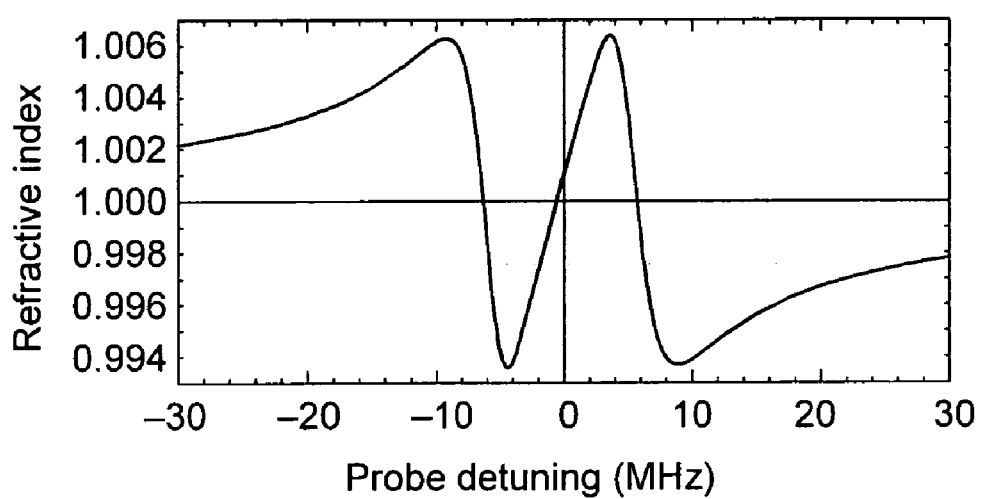
FIG. 1C is a graph illustrating the refractive index as observed by $\omega_p$ as a function of $\omega_p$.

In fact, the EIT non-linear scheme might even be advantageous in terms of bandwidth compared to a Kerr-effect non-linear scheme. The way to see this is to note the maximum induced $\delta n$ through a Kerr scheme in any nearly-instantaneous non-linear material is $0.001 \geq \delta n$. On the other hand, the perturbation theory implies that the maximum resonance shift is given by $\delta n/n \geq \delta \omega/\omega$. Furthermore, the resonance shift must be larger than the line-width of the cavity, so $\delta \omega/\omega \geq 1/Q$. For typical materials combining these constraints means that $Q \geq 4000$, implying that the useful bandwidth of the device is always smaller than 50 GHz ($\approx 20$ Gbit/sec) or so at 1.55 µm. In EIT schemes $\delta n$ can be as large as 0.01, which buys us one order of magnitude in bandwidth. (Note that the entire positive low group velocity region of FIG. 1C can be made transparent by making the optical density small (e.g. 1), while keeping the atom density high.) Alternatively, the system can actually afford to operate in the absorptive regime! When the field $\omega_{24}$ is sufficiently large (or alternatively, $\omega_C$ is turned off), the cavity interior becomes strongly absorptive as far as $\omega_p$ is concerned. Instead of causing large losses in $\omega_p$, $\omega_p$ is almost entirely reflected, with negligible losses, at the entrance of the cavity, or else re-routed to another port. All in all, the maximum achievable $\delta n$ does not present a bandwidth limitation in the EIT scheme.

Another issue that has to be considered is the fact that in order to have a good EIT, the atoms need to be in a particular super-position of states |1>, and |2>, called the dark-state. Of course, interaction with the environment (e.g. thermal phonons and thermal photons) in the material can kick the EIT atoms out of the dark-state, and ruin the EIT. In order to keep the phonon excitation at acceptably low levels, solid-state EIT typically has to be done at very low temperatures. In the broad bandwidth case, the distance between the states |1> and |2> has to be fairly large in order to be compatible with the broad bandwidth requirements. Consequently, a fairly energetic phonon is needed to cause a transition between those two states; thereby, it is expected that the scheme could be viable at higher temperatures than the usual solid-state EIT in which the distance between the states |1> and |2> is much smaller.

Note that the local electric field (due to the crystal) seen by each EIT atom splits each of its hyperfine levels into Zeeman sub-levels. The solid-state EIT experiments done so far were done with very small bandwidth signals, so it was acceptable to use single Zeeman sub-levels as the EIT states. When one wants to use broad-bandwidth schemes, most likely one will have to deal with the fact that for example the bandwidth of $\omega_p$ will be broad-enough to address more than one Zeeman sub-level at any given time. For this high bandwidth case, the problem with inhomogeneous broadening of different Zeeman sublevels is mitigated; if the coupling field is large enough, the small energy differences between the Zeeman sub-levels are within the EIT bandwidth.

If the hyperfine states are too close compared to the bandwidth, more than one hyperfine state might be addressed at any given time. One option is to look for an atomic system in which the distance between hyper-fine states is large enough so this is not an issue. Another option is to look for an atomic system in which each of the EIT states has only a single hyperfine level. Finally, there might be systems in which all hyperfine states of a single level can be made to act as effectively being a single state; in that case, the problem of having hyperfine states too close would be mitigated in the same way to solve the problem of having Zeeman sub-levels too close to each other.

There are solid-state materials in which the inhomogeneous broadening is as small as 4 GHz. This is significantly smaller than the bandwidth of say 10 Gbit/sec ($\approx 25$ GHz) signal at 1.55 µm. Therefore, it is conceivable that since the coupling field that needs to be provided to support the 25 GHz bandwidth of $\omega_p$ is large enough not to be bothered by the relatively small (4 GHz) uncertainty in the level positions. Moreover, the bandwidths of $\omega_p$ and $\omega_{24}$, which would both presumably have to be $\approx 25$ GHz, are certainly large enough to more than cover the whole 4 GHz inhomogeneous width. Not having to worry about the inhomogeneous width would clearly be of great advantage.

It is important to emphasize that the devices of the kind described herein should also be a great framework to implement the "stopping" of light in EIT. Once the light is "stopped" inside the cavity, one can manipulate it with other beams with the purpose of quantum information processing. The reason for this is because the precise position where the light is stopped is known, and since the cavity, being effectively an "attractor" for light, is very easy to access with other beams. The invention provides much more design robustness and flexibility in implementing quantum information processing.

By combining EIT with photonic crystal cavities, the inventive devices provide extreme non-linear sensitivity. Such devices could lead to important applications in quantum information processing, telecommunications, and all-optical computing. Furthermore, the inventive devices are very suitable for implementation of any kind of cavity quantum electrodynamics (QED), not just EIT.

Although the present invention has been shown and described with respect to several preferred embodiments thereof, various changes, omissions and additions to the form and detail thereof, may be made therein, without departing from the spirit and scope of the invention.

What is claimed is:

1. A photonic crystal structure containing a microcavity structure that is doped with materials that comprise a single EIT atom or a single EIT quantum-dot, and exhibit electromagnetic induced transparency (EIT) so as to increase the non-linear properties of said photonic crystal systems.

2. The microcavity structure of claim 1, wherein said materials are doped using a scanning tunnel microscope related techniques.

3. The microcavity structure of claim 1, wherein said materials are doped with a plurality of EIT atoms.

4. The microcavity structure of claim 3, wherein said materials are doped using a scanning tunnel microscope.

5. The microcavity structure of claim 1, wherein said photonic crystal structure is a three dimensional photonic crystal structure.

6. The microcavity structure of claim 1, wherein said photonic crystal structure is a two dimensional photonic crystal structure.

7. The microcavity structure of claim 1, wherein said photonic crystal structure is a multi-layered structure of varying indices.

8. The microcavity structure of claim 7, wherein said multi-layered structure forms a multi-layered film.

* * * * *